Aug. 25, 1953
E. H. TAYLOR
2,650,115
PIPE COUPLING
Filed April 4, 1950
2 Sheets-Sheet 1
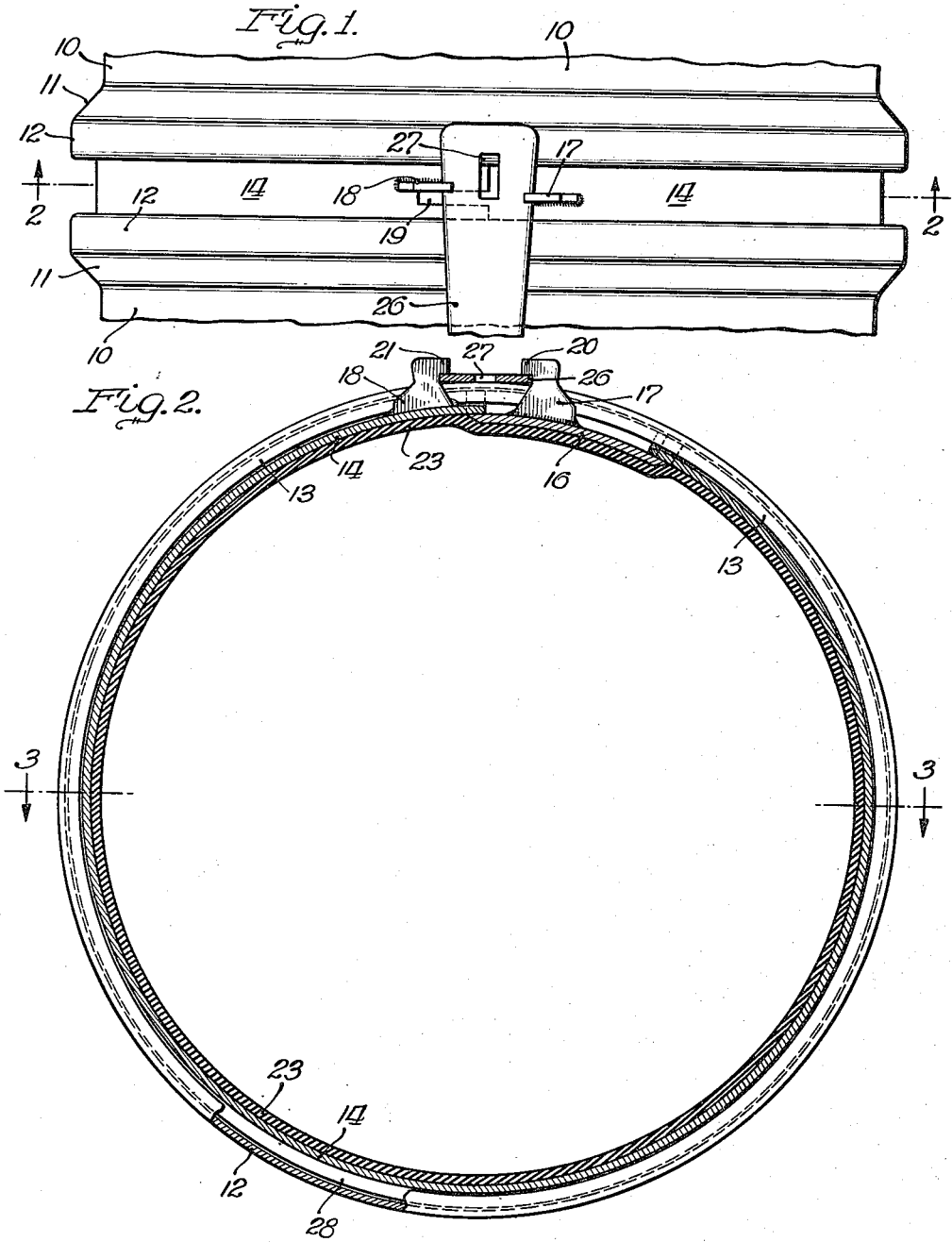
INVENTOR.
Edward Hall Taylor
BY
Brown, Jackson, Boettcher & Dienner
Atty's

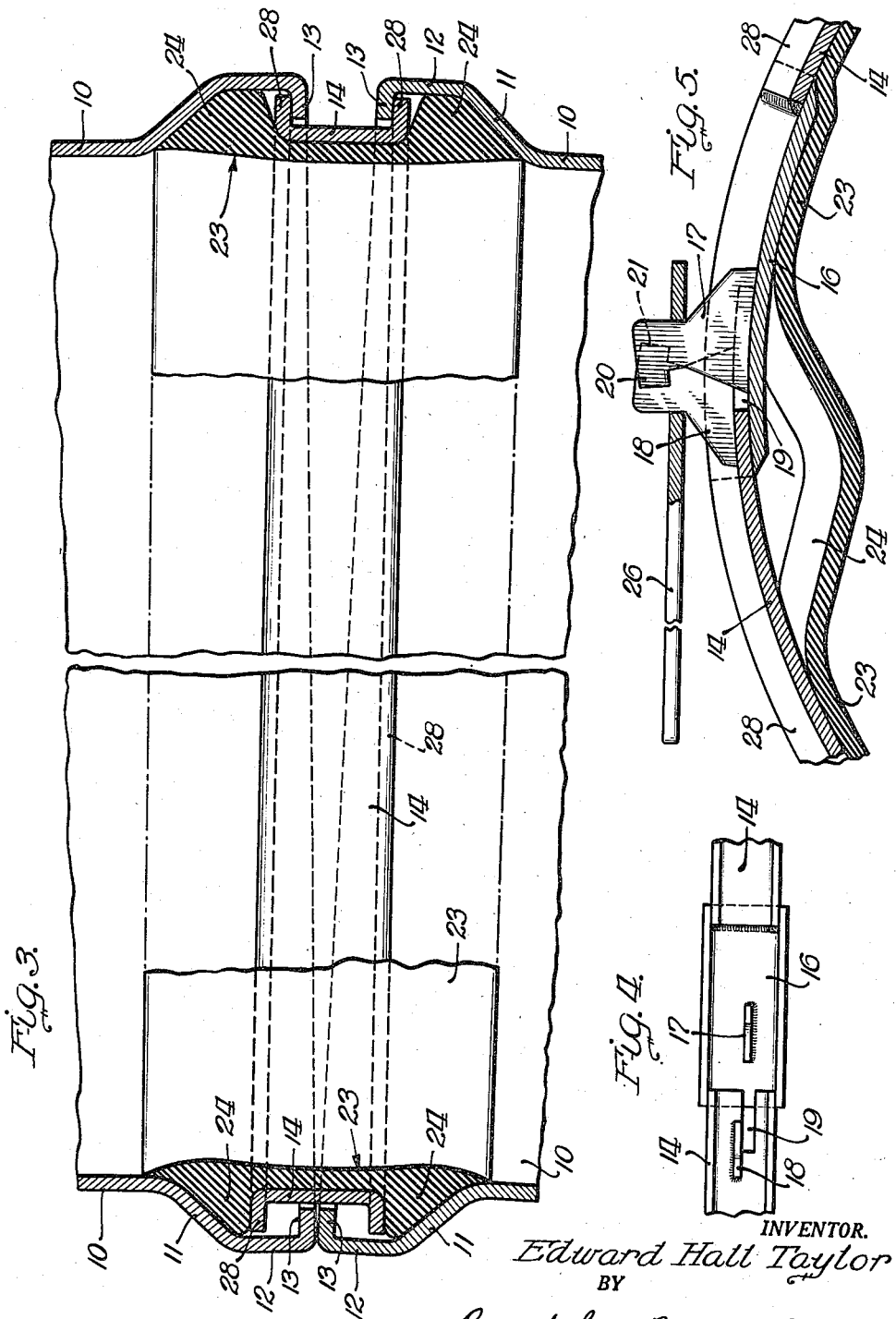

Patented Aug. 25, 1953

2,650,115

UNITED STATES PATENT OFFICE 2,650,115

PIPE COUPLING

Edward Hall Taylor, Winnetka, Ill., assignor to Taylor Forge & Pipe Works, Cicero, Ill., a corporation of Illinois Application April 4, 1950, Serial No. 153,801

2 Claims. (Cl. 285—197)

This invention relates to coupling means for coupling together pipe ends or fittings.

Pipe couplings of various types are known and extensively used. In general, the known pipe couplings are rather expensive and involve an unnecessary number of parts, and, in many cases, necessitate the use of differently formed or constructed pipe ends, so that care is necessary in assembling the pipe ends in proper relation, which may, in some cases, incur considerable loss of time.

My invention is directed to a pipe coupling of simple and inexpensive construction, which comprises a minimum number of parts and in which the pipe ends to be coupled together are of the same construction so that care is not required in assuring that the pipe ends are properly matched. Further, the coupling of my invention may be quickly assembled and disassembled with expedition and facility. To that end, I provide pipe ends having end flanges extending radially inward, restrained against movement apart by a coupling ring having end members overlapping the axially inner faces of the pipe end flanges, and an elastic sealing ring exposed to the pressure within the pipe ends and held seated thereby so as to provide a fluid-tight and pressure resistant seal with the pipe ends and the coupling ring. Preferably, though not necessarily, the pipe ends are flared so as to provide inclined surfaces on which the end sealing elements of the sealing ring seat and along which the end elements of the sealing ring are urged toward the coupling ring, by the pressure within the pipe ends, to which the sealing ring is subjected, so as to assure highly effective seals between the end sealing elements of the sealing ring and the pipe ends and the coupling ring. Additionally, the coupling of my invention is so constructed as to accommodate angularity between the pipe ends without detracting from the seal therebetween.

Further objects and advantages of my invention will appear from the detail description.

In the drawings:

Figure 1 is a plan view of a pipe coupling embodying my invention;

Figure 2 is a sectional view taken substantially on line 2—2 of Figure 1;

Figure 3 is a sectional view, partly broken away, on an enlarged scale, taken substantially on line 3—3 of Figure 2;

Figure 4 is a fragmentary plan view, on the same scale as Figure 1, of the coupling ring showing the telescoping end portions thereof and associated parts; and Figure 5 is a fragmentary sectional view, on an enlarged scale, of the coupling ring and the sealing ring, taken substantially in the same plane as Figure 2 but showing the coupling ring as contracted for positioning in the pipe ends, this view also showing the means for holding the coupling ring contracted.

I have shown the coupling of my invention as applied to two pipe ends 10 disposed adjacent each other. The pipe ends 10 are of the same construction, and each comprises a belled or outwardly flared portion 11 from which extends a cylindrical portion 12 provided at its axially outer end with a circumferential flange 13 extending radially inward thereof. When the pipe ends 10 are axially aligned, the flanges 13 thereof are spaced apart, as shown in Figure 1. While the pipe ends 10 preferably are belled as shown, that is not essential to the broader concept of my invention, and the pipe ends may be otherwise suitably formed.

A coupling ring 14, of channel cross section, is disposed radially inward of the flanges 13, bridging the space therebetween. The coupling ring 14 preferably is formed of steel or other suitable metal, and possesses considerable resiliency, normally being held expanded by its inherent resiliency when in position in the coupling. This ring 14 is split transversely, and has secured to one end thereof, conveniently by welding, a channel element 16 fitting about that end portion of the ring and slidably receiving the other end portion of ring 14 which telescopes the element 16. This element 16 constitutes a part of the ring 14, as will be clear from what has been said. A lug 17 is suitably secured, conveniently by welding, to element 16 and extends radially outward therefrom, a similar lug 18 being welded to the end portion of ring 14 which telescopes element 16, this end portion of ring 14 being provided with a slot 19 for reception of lug 17 when the ring 14 is contracted, as will appear more fully presently. The lug 17 is provided, at its outer end, with a hook or bill 20 extending toward the lug 18, and the latter lug is provided with a similar hook or bill 21 extending toward the lug 17.

A sealing ring 23, formed of rubber or other suitable elastic material, is disposed at the radially inner face of coupling ring 14. This sealing ring 23 is of substantially channel cross section, providing a channel which receives the coupling ring 14 and two sealing elements or ribs 24 of generally triangular cross section, substantially conforming to the radially inner faces of the flaring portions 11 of pipe ends 10 and the inner faces of portions 12 of pipe ends 10 at the areas thereof contiguous to the flared portions 11.

The coupling ring 14 and the sealing ring 23 together constitute a unit which may readily be inserted into and removed from the pipe ends. In order to insert this unit, the coupling ring 14 is contracted so that the lugs 17 and 18 are positioned in proximity to each other, and is held contracted in a suitable manner, conveniently by means of a wedge plate 26 having a slot 27 therein of appropriate size to receive the two lugs 17 and 18. When the coupling ring 14 is thus held contracted, the portion of sealing ring 23 adjacent the ends of ring 14 is buckled radially inward or downward as shown in Figure 5. With the rings 14 and 23 thus contracted, the unit is then inserted into one of the pipe ends 10, with one flange 28 of coupling ring 14 disposed axially inward of the corresponding flange 13 of that pipe end. The other pipe end 10 is then moved toward the first pipe end so that the other flange 28 of coupling ring 14 is also disposed radially inward of flange 13 of the second pipe end. After the coupling and sealing unit, comprising the coupling ring 14 and the sealing ring 23, has thus been disposed within the pipe ends, the plate 26 is removed, thus releasing the lugs 17 and 18 and permitting the ring 14 to expand due to its inherent resiliency, the sealing ring 23 also expanding so as to seat against the radially inner face of the channel element 16 as shown in Figure 2. When the pipe ends are in axial alignment, the flanges 28 of coupling ring 14 overlap the inner faces of flanges 13 of the pipe ends, as shown at the right of Figure 3, for the full circumference thereof. The coupling ring 14 then effectively restrains the pipe ends against movement apart. It will further be noted that the radially inner surface of seal ring 23 is exposed to the interior of the pipe ends, so as to be forced radially outward thereof by pressure within the pipe ends. The seal ring 23 then provides a pressure-resistant and fluid-tight seal with the accompanying ring 14 and with the pipe ends. Further, by having the pipe ends flared, as shown, the pressure exerted on the sealing elements or ribs 24 of the sealing ring 23 tends to crowd those elements outwardly along the flared portions 11 of the pipe ends so as to hold them in tight sealing contact therewith and with the ends of the coupling ring 14. There is thus a distinct advantage in having the pipe ends flared as shown, though that is not essential to the broader concept of my invention, and the pipe ends may be otherwise suitably formed, as well as the sealing ring 23, as will be understood. The plate 26 preferably is tapered, as shown in Figure 1, and when the coupling has been properly assembled as above described, is driven between the lugs 17 and 18, beneath the bills 20 and 21 thereof, as in Figure 1, so as to hold the coupling ring 14 fully expanded. That is not essential, particularly in cases where high pressure is maintained in the run or line of pipe, though ordinarily I prefer to employ the wedge plate 26 for holding the coupling ring 14 fully expanded in the manner stated.

Due to the fact that the flanges 13 of the pipe ends are spaced apart a substantial distance, as shown in Figure 1 and at the right of Figure 3, this coupling will accommodate disalignment of the pipe ends to a certain extent. Referring to Figure 3, the pipe ends are shown at an angle of approximately 3 degrees to each other, the flanges 13 at the left of this figure being in contact and those at the right being spaced apart the maximum distance permitted by the coupling ring 14. This angular relation of the pipe ends is permitted by the elastic sealing ring 23 in conjunction with the channel coupling ring 14 of appropriate width to permit of angularity between the pipe ends. When the pipe ends are thus disposed in angular relation, the flanges 13 thereof at the side of the coupling disposed outwardly of the angle between the pipe ends cooperate with the flanges 28 of coupling ring 14 to restrain the pipe ends against movement apart. When it is desired to uncouple the pipe ends, the coupling ring 14 is contracted as before, the pipe ends are separated, and the unit comprising the coupling ring 14 and the sealing ring 23 is then removed from the pipe ends. This uncoupling of the pipe ends may be effected with expedition and facility, and, by reversing the operation, the pipe ends may be quickly and easily coupled together in the manner above described.

It will be understood that changes in detail may be resorted to without departing from the field and scope of my invention, and I intend to include all such variations, as fall within the scope of the appended claims, in this application in which the preferred form only of my invention has been disclosed.

I claim:

1. In flexible pipe coupling and sealing means, two adjacent pipe ends having circumferential terminal flanges extending radially inward thereof, a coupling ring of channel cross section disposed radially inward of said flanges and having end flanges extending radially outward in overlapping relation to the axially inner faces of said pipe end flanges, said coupling ring being otherwise free from said pipe ends and said flanges of said coupling ring being spaced apart axially thereof a distance materially greater than the combined thickness of said pipe end flanges axially of said pipe ends and said coupling ring being unobstructed between said flanges thereof except for said pipe end flanges, whereby said pipe end flanges are free for movement toward and away from each other between said coupling ring flanges to accommodate relative movement and disalignment of said pipe ends, and sealing means comprising an elastic sealing ring having sealing elements seating about the ends of said coupling ring and on the inner circumferential surfaces of said pipe ends in sealing contact therewith, said elements being exposed at their radially inner surfaces to the interior of said pipe ends so as to be urged radially outward and held seated by pressure within said pipe ends.

2. In flexible pipe coupling and sealing means, two adjacent pipe ends respectively comprising an outwardly flaring portion and a cylindrical portion extending axially outward from said flaring portion and provided at its axially outer end with a circumferential flange extending radially inward, a coupling ring of channel cross section disposed radially inward of said flanges and having end flanges extending radially outward in overlapping relation to the axially inner faces of said pipe end flanges, said coupling ring being otherwise free from said pipe ends and said flanges of said coupling ring being spaced apart axially thereof a distance materially greater than the combined thickness of said pipe end flanges axially of said pipe ends and said coupling ring being unobstructed between said flanges thereof except for said pipe end flanges, whereby said pipe end flanges are free for movement toward and away from each other between said coupling ring flanges to accommodate relative movement and disalignment of said pipe ends, and an elastic sealing ring of substantially channel cross section providing a channel receiving said coupling ring and end ribs substantially conforming to and fitting within said flaring and cylindrical portions of said pipe ends, the radially inner face of said sealing ring being substantially flush with and constituting a continuation of the inner surfaces of said pipe ends at the junctures thereof with the axially inner ends of said outwardly flaring portions.

EDWARD HALL TAYLOR.

References Cited in the file of this patent

UNITED STATES PATENTS

| Number | Name | Date |
|---|---|---|
| 406,683 | White | July 9, 1889 |
| 586,180 | Hamlin | July 13, 1897 |
| 831,551 | Guttzeit | Sept. 25, 1906 |
| 839,381 | Greenfield | Dec. 25, 1906 |
| 943,900 | Smith | Dec. 21, 1909 |
| 2,517,290 | De Moude | Aug. 1, 1950 |